June 29, 1954     E. A. NEUGASS     2,682,251
ILLUMINATED KNOB
Filed Oct. 25, 1951

INVENTOR.
EDWIN A. NEUGASS.
BY
ATTORNEY.

Patented June 29, 1954

2,682,251

UNITED STATES PATENT OFFICE 2,682,251

ILLUMINATED KNOB

Edwin A. Neugass, White Plains, N. Y.

Application October 25, 1951, Serial No. 253,109

8 Claims. (Cl. 116—129)

The present invention generally related to illuminated knobs for controlling the elements of electronic devices and the like, and particularly to internally illuminated knobs for the described purpose.

It is necessary that the illumination of all instruments or other devices located in the control or operating area of a vehicle, such as, for example, the cockpit of an airplane or the bridge or wheelhouse of a ship, be of a red color to maintain the dark adaptation of the pilot's or operator's eyes. This requirement is set forth in the United States Air Force-Navy Aeronautical Specifications, which further require that there be a high degree of color contrast between the panels bearing the instruments or the control knobs thereof and any lettering or other indicia adorning the panels or knobs when viewed in daylight and that the panels and knobs have low specular gloss.

Panels satisfying these requirements have been provided in United States Patent No. 2,518,726 wherein the panel consists of three layers of material comprising a layer of transparent material with a next adjacent layer of translucent material superimposed thereon and an outer layer of opaque material superimposed over the translucent layer, or of five layers of material, the center layer of which is transparent, the two next adjacent layers of which are translucent and superimposed directly upon the transparent layer at the opposite sides thereof, and the front and back outer layers of the panel are opaque and superimposed directly upon the translucent layer. The indicia on the panel are provided by openings formed through the front opaque layer and extending to the underlying layer of translucent material and a light, having a suitable red color filter, is provided for directing light through the central transparent layer to the translucent layer to transilluminate the latter at the indicia defining openings in the opaque layer. In order to provide the necessary high color contrast when viewed in daylight, the outer opaque layer, having the openings formed therein, is preferably black, while the translucent layers are white, and the low specular gloss is furnished by giving the opaque layers a matte finish.

It is apparent that any chipping of the opaque outer layers, particularly the front penetrated opaque layer, will cause unwanted areas of the panel to pass light when the panel is illuminated. In constructing flat or planar panels such chipping may be deterred by forming the outer black and opaque layers of abrasion-resistant vinyl which is laminated, by means of heat and pressure, into a sandwich with the interposed layers of translucent and transparent material. However, in providing indicia bearing knobs internally illuminated in a manner similar to that described above in connection with panels, the complex contour of the knob makes it impossible to laminate a continuous layer of abrasion-resistant vinyl onto the underlying translucent layer in order to resist puncturing of the opaque outer layer, and the extension of the knobs ahead of the panel exposes them to the increased possibility of being chipped by contact with hard or sharp objects.

It is therefore an object of the present invention to provide control knobs which are constructed to be internally illuminated and are endowed with the ability to resist chipping away of the outer penetrated opaque layer.

Another object resides in the provision of control knobs which are formed to be internally illuminated from the back by an illuminated panel of the type disclosed in United States Patent No. 2,518,726, and are capable of resisting chipping or wearing away of the penetrated opaque outer layer thereof.

Another object resides in providing a control knob which is formed of a transparent body having a layer of translucent material covering the entire transparent knob body with the exception of the back surface of the latter, and an outer layer of dark or black surfaced metallic material covering the translucent layer and formed with indicia defining openings exposing selected areas of the translucent area so that the metallic layer resists chipping or wearing such as would expose unwanted areas or parts of the translucent layer.

Still another object of the present invention is to provide an indicia bearing, internally illuminated control knob of the described character, wherein the metallic opaque outer layer is preferably formed of aluminum applied by hot spraying or electro-plating and the black or dark colored surface thereof is provided by anodizing the opaque aluminum outer layer black.

A further object of the present invention resides in providing an indicia bearing, internally illuminated knob of the described character wherein the metallic opaque outer layer has a stippled surface to provide a matte finish of low specular gloss.

The above, and other objects, features and advantages of the present invention, will be apparent in the following detailed description of an illustrative embodiment thereof when the description is read in connection with the accompanying drawings forming a part hereof and wherein.

Figure 1:
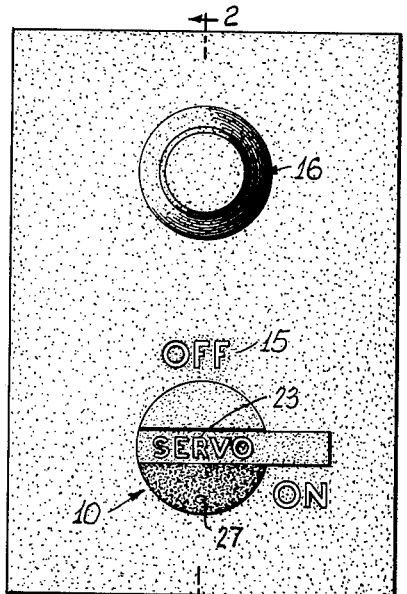
Fig. 1 is a front elevational view of a control panel having an internally illuminated control knob thereon which is constructed according to an embodiment of the present invention.
Figure 2:
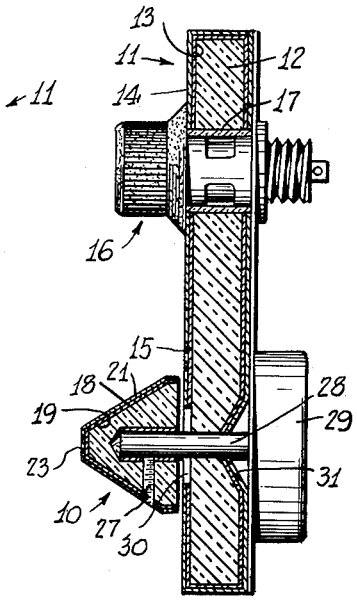
Fig. 2 is a vertical sectional view taken along the line 2—2 of Fig. 1.
Figure 3:
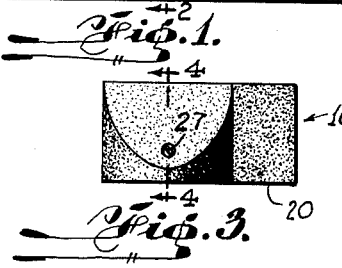
Fig. 3 is a side elevational view of the control knob of Fig. 1.
Figure 4:
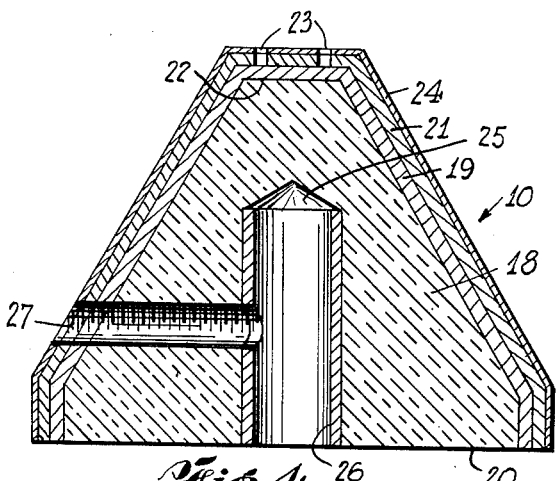
Fig. 4 is a sectional view of the control knob taken along the line 4—4 of Fig. 3, but shown on an enlarged scale.

Referring to the drawings in detail, and initially to Figs. 1 to 4, inclusive, thereof, a control knob embodying the present invention is there shown and generally indicated by the reference numeral 10. The knob 10 is shown in Figs. 1 and 2 as mounted on a panel, generally indicated by the reference numeral 11, which is preferably of the type disclosed in the United States Patent No. 2,518,726. The panel 11 is shown to include a central core 12 of transparent or light transmitting material having an enveloping layer 13 of light colored, preferably white, translucent material extending thereabout, and an outer layer 14 of dark, preferably black, opaque material. Suitably shaped openings are formed through the outer opaque lever at the front of the panel to expose the underlying translucent white layer and thereby define desired indicia 15, for example, the "off" and "on" indications of Fig. 1. Light admitting means 16 of conventional construction, such as panel lights manufactured under Part #A4295, by Grimes Mfg. Co., of Urbana, Ohio, and therefore not described in detail, is installed in the panel 11 and either has a red bulb therein or is installed within a red colored filter, such as the filter 17 (Fig. 1), so that the light directed into the central light transmitting layer 12 will be red colored.

The red light transmitted by the layer 12 serves to transilluminate the translucent layer 13 at the portions of the latter disposed at the inner ends of the openings formed in the front opaque layer 14 which define the indicia 15.

The knob 10 embodying the present invention includes a suitably shaped body 18 (Figs. 2 and 4) of transparent, light transmitting and preferably plastic material, such as, for example, methyl methacrylate. A relatively thin layer, coating or film 19 of light colored translucent material, preferably of the class of polyvinyl or vinyl resins or materials, their polymers or co-polymers, such as, for example, polyvinyl chloride, vinyl chloride-acetate copolymers, polyvinyl-idene chloride, or vinyl chloride-vinylidene chloride copolymers, and preferably white when viewed in daylight, encloses the entire body 18 with the exception of the back surface 20 of the latter which is polished to receive light directed forwardly against the body.

An opaque outer layer 21 covers the translucent layer 19 and, in accordance with the present invention, is formed of a metal material to resist abrasion or chipping. The body 18 is preferably formed with a flattened front face 22, and the portion of the metal layer 21 overlying the face 22 is formed with suitably shaped openings 23 defining desired indicia, such as, the word "Servo" on the illustrated knob, which openings expose the underlying translucent white layer 19. In order to provide the desired color contrast between the exposed portions of white layer 19 and the surrounding areas of the metal layer 21, the outer surface is dark colored and preferably black.

In a preferred embodiment of the invention the layer 21 is formed of aluminum which is applied to the underlying translucent white layer 19 by the known process of hot spraying or "metallizing," with the outer surface of the layer 21 being anodized black as at 24 to provide the desired color contrast. While the preferred embodiment has the layer 21 formed of aluminum anodized black, this layer, if desired may be formed of other metals, such as, copper or zinc, and may be applied either by the process of hot spraying or by electro-plating after the surface of the layer 19 has been suitably sensitized in a well known manner. In cases where metals other than aluminum are utilized for the layer 21, the black outer surface of the latter may be provided by applying a coat or film of black opaque paint.

The openings 23 in the metal layer 21 may be created by etching away the latter with either acid or electric means or by preventing the deposit of the metal layer at the locations to have such openings as with a stencil or by applying wax or other stop coating to such areas, as when the metal layer is applied by electro-plating.

The body 18 of the knob 10 is formed with a bore 25 opening at the back surface 20 and receiving a metal bushing 26. A radial tapped hole 27 opens through the bushing 26 to receive a set screw (not shown) for locking the knob on the actuating shaft 28 (Fig. 2) of a control switch 29 or other electrical unit mounted behind the panel 11.

In order to utilize the light transmitted by the panel core 12 for illuminating the indicia 23 on the knob 10, the translucent layer 19 and opaque layer 14 at the front of the panel are cut away as at 30 so that light emitted forwardly from the transparent core 12 through the cut-away 30 will enter the knob body 18 at the polished rear surface 20 of the latter. The cut-away 30 has an area substantially smaller than the back of the knob so that the light transmitted forwardly or emitted at the cut-away 30 will not be directed ino the observer's eyes.

Further, in order to increase emission of light forwardly through the cut-away 30, the back surface of the panel 11 is indented or beveled as at 31 which serves to reflect the light transmitted through the core 12 forwardly out of the uncovered portion of the latter.

Thus, the indicia defined by the openings 23 may be illuminated by the transillumination of the translucent layer 19 by the red light emitted from the light source 16, and, when the light source is inactive, ambient light will be reflected from the exposed parts of the white translucent layer, and by reason of the sharp color contrast provided between such exposed parts and the black outer surface of the metal layer 21, the indicia will be clearly defined.

Since the outer surface of the metal layer 21, whether it is applied by spraying or by electro-plating, will be stippled or rough, the result will be to provide a matte finish of low specular gloss.

Figure 5:
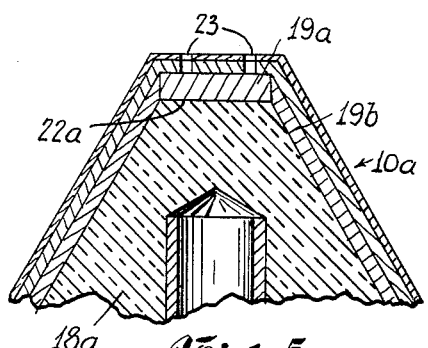
Fig. 5 is a fragmentary sectional view, similar to Fig. 4, but illustrating the construction of a control knob embodying another form of the present invention.

Referring now to Fig. 5, a detail of a knob 10a constructed according to another embodiment of the present invention is there shown. The knob 10a is distinguished from the knob first described herein only in that the translucent layer is formed of two portions, that is, a portion 19a covering the flat front face of the body 18a, and a remaining portion 19b covering the irregularly shaped remainder of the body 18a. The portion 19a of the translucent layer is formed of a layer of suitable plastic material laminated to the surface 22a of the body 18a by the application of heat and pressure, while the remainder 19b of the translucent layer may be conveniently applied in liquid form by spraying or by spreading it on the body 18a as with a brush.

Having thus described illustrative embodiments of the present invention, it will be apparent that internally illuminated control knobs have been provided wherein the penetrated opaque outer layer is formed of a metal to resist abrasion and chipping so that unwanted parts of the underlying translucent layer will not be exposed to confuse the illumination of the indicia provided on the knob.

While preferred embodiments of the invention have been described and illustrated, it should be understood that the invention is not limited to these precise embodiments and that many changes and modifications, obvious to one skilled in the art, may be effected therein without departing from the spirit and scope of the invention as defined in the appended claims.

What I claim is:

1. A knob comprising a body of transparent material having a high-glass back surface, a layer of translucent material covering all but the back surface of said body so that light may be admitted to said body through said back surface thereof, and an outer layer of metal covering said translucent layer and having indicia defining openings formed therethrough to expose the underlying portions of said translucent layer so that light directed at said back surface of the knob body will transilluminate said underlying portions for illuminating said indicia.

2. A knob as set forth in claim 1; wherein said outer layer has a black outer surface and said translucent layer is white to provide a sharp color contrast when said indicia are viewed under ambient light.

3. A knob as set forth in claim 1; wherein said outer layer consists of aluminum having a black oxidized outer surface and said translucent layer is white to provide a sharp color contrast when said indicia are viewed under ambient light.

4. A knob comprising a body of light transmitting material, means separate from said body and in back thereof for admitting light to said body, a layer of translucent material covering substantially all of said body with the exception of the back of the latter, and a metal outer layer covering said translucent layer and having indicia defining openings formed therethrough to expose the underlying portions of said translucent layer so that said underlying portions will be transilluminated to illuminate said indicia.

5. A knob as set forth in claim 4; wherein said metal outer layer has a black outer surface and said translucent layer is white so that a sharp color contrast is provided at said indicia when the latter are viewed under ambient light.

6. A knob as set forth in claim 4; wherein said metal outer layer consists of aluminum having a black oxidized outer surface and said translucent layer is white so that a sharp color contrast is provided at said indicia when the latter are viewed under ambient light.

7. A knob comprising a body of light transmitting material having a high-glass back surface and a flat front portion, a layer of translucent material covering all but said back surface of said body, an outer metal layer covering said translucent layer and having indicia defining openings formed therethrough in the area adjacent said flat front portion to expose the underlying parts of said translucent layer, and means separate from said body and in back thereof for admitting light to said body through said back surface of the latter.

8. In combination; a panel comprising a core of light transmitting material, a layer of translucent material covering at least the front surface of said core, an outer layer of opaque material overlying said translucent layer, and means for admitting light to said core; and a knob mounted in front of said panel and comprising a body of light transmitting material having a high-glass back surface, a translucent layer covering all but said back surface of the body, and a metal layer covering said translucent layer of the knob and having indicia defining openings formed therethrough at the front to expose underlying portions of the last mentioned translucent layer, said translucent and opaque layers of said panel being cut away in an area covered by said back surface of the knob body to permit light to be emitted forwardly from said core into the interior of said body for transilluminating said exposed portions of the translucent area of said knob.

References Cited in the file of this patent

UNITED STATES PATENTS

| Number | Name | Date |
| --- | --- | --- |
| 1,988,012 | Mason | Jan. 15, 1935 |
| 2,278,520 | Klein | Apr. 7, 1942 |
| 2,308,844 | Wilshusen | Jan. 19, 1943 |
| 2,354,857 | Gits | Aug. 1, 1944 |
| 2,518,726 | Schlenker | Aug. 15, 1950 |
| 2,566,026 | Hughes | Aug. 28, 1951 |
| 2,594,081 | Schlenker | Apr. 22, 1952 |
| 2,602,036 | Sullivan | July 1, 1952 |

FOREIGN PATENTS

| Number | Country | Date |
| --- | --- | --- |
| 313,852 | Great Britain | Sept. 17, 1930 |